Nov. 8, 1960   F. M. RYCK   2,958,892
WIPER ARM CONNECTOR ATTACHMENT MEANS
Filed Sept. 30, 1957

INVENTOR.
Francis M. Ryck
BY
G. H. Strickland
His Attorney

United States Patent Office 2,958,892
Patented Nov. 8, 1960

2,958,892

WIPER ARM CONNECTOR ATTACHMENT MEANS

Francis M. Ryck, Rochester, N.Y., assignor to General Motors Corporation, Detroit, Mich., a corporation of Delaware Filed Sept. 30, 1957, Ser. No. 687,106

7 Claims. (Cl. 15—250.32)

This invention pertains to windshield cleaners, and particularly to means for attaching an arm connector to a wiper blade assembly.

Heretofore, it has been customary to attach clips, or wiper arm connectors, for straight end arms to the superstructure of a wiper blade by means of a pin or rivet. With this type of connection it has been noted that after a relatively short period of use, the pivotal connection becomes loose permitting the connector to move universally rather than about a single axis in a plane parallel to the windshield and transverse to the longitudinal axis of the blade. In particular, movement of the connector about an axis normal to the windshield is undesirable since such movement of the connector allows the blade to turn in the plane of the glass. The present invention relates to improved means for pivotally attaching an arm connector to the blade superstructure which will prevent undesirable freedom of pivotal movement. Accordingly, among my objects are the provision of improved means for pivotally attaching a connector to a wiper blade; the further provision of a connector having a pair of depending arms; and the still further provision of a connector of the aforesaid type which is attached to the blade superstructure by a locking plate.

The aforementioned and other objects are accomplished in the present invention by partially physically confining the attaching portions of the connector within the blade superstructure. Specifically, the connector is of generally channel shape and constitutes a socket for receiving a straight end arm. The connector may include a latch spring for establishing a detachable connection between the connector and the holder end of a wiper arm. The connector is formed with a pair of spaced, depending arms, or tangs. The holder of the blade superstructure which is of channel shape, has a pair of slots adapted to receive the depending arms of the connector. The slots in the holder are of somewhat greater longitudinal extent than the depending arms on the connector, but the width of the slots is controlled to confine the depending arms of the connector and prevent undesirable pivotal movement of the connector about an axis normal to the surface of the windshield.

The connector is locked in place within the channeled holder by a locking plate disposed within the channeled holder and over which the ends of the depending arms of the connector are formed. The locking plate is disposed in a plane spaced from the inner surface of the channeled holder so as to permit tilting of the connector about an axis parallel to the windshield throughout a predetermined angle, the limits of which are determined by engagement of the plate and the channeled holder.

Further objects and advantages of the present invention will be apparent from the following description, reference being had to the accompanying drawings, wherein a preferred embodiment of the present invention is clearly shown.

Figure 1:
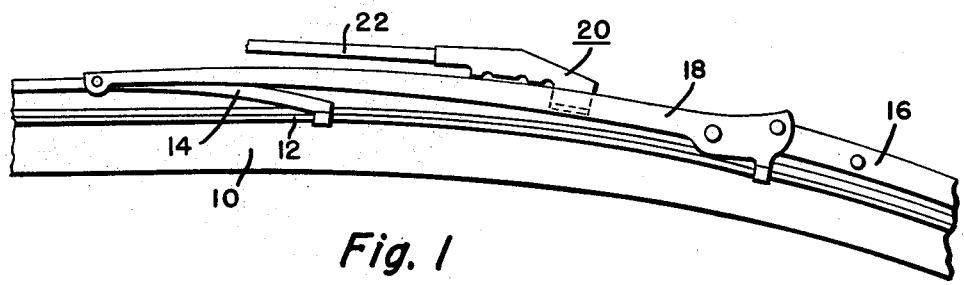
Figure 1 is a fragmentary view in elevation of a wiper blade and arm assembly having a connector constructed according to this invention.

With particular reference to Figure 1, a portion of a flexible wiper blade for cleaning a curved surface is shown including a rubber wiping element 10 carried by a flexible backing strip 12. Wiping pressure is imparted to the squeegee unit comprising the wiping element 10 and the flexible backing strip 12 through secondary pressure distributing members 14 and 16 which are connected at longitudinally spaced points to the flexible backing strip in a conventional manner. The secondary pressure distributing members 14 and 16, respectively, are pivotally connected to a primary pressure distributing member, or holder 18. The primary pressure distributing member, or support, as well as the secondary pressure distributing members are channel shaped, and the blade assembly depicted is of the type shown in copending application Serial No. 496,132, now Patent No. 2,901,761 filed March 23, 1955, in the name of Cyril T. Wallis and assigned to the assignee of this invention.

Figure 2:
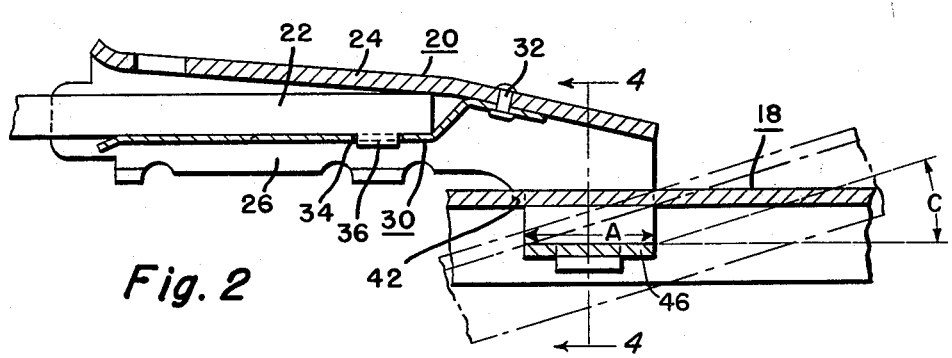
Figure 2 is a fragmentary sectional view of the connector.
Figure 4:
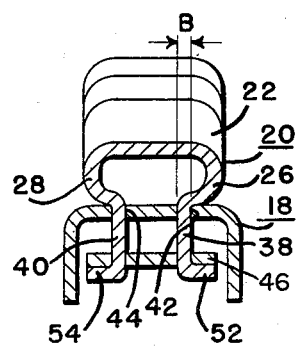
Figure 4 is a sectional view taken along line 4—4 of Figure 2.

The connector of this invention is depicted generally by the numeral 20 in Figure 1, the connector being designed to receive the entering end of a straight end wiper arm 22. With reference to Figures 2 and 4, the connector 20 comprises an inverted channel shaped member having a top wall 24 and side walls 26 and 28. A latch spring 30 is attached to the top wall 24 by means of a rivet 32, the latch spring 30 having an opening 34 therein for receiving a nub 36 formed on the straight end arm 22. The side walls 26 and 28 are formed with integral depending arms, or tangs, 38 and 40, respectively, and the channeled holder 18 is formed with a pair of spaced slots 42 and 44 of somewhat greater longitudinal extent than the dimension A of the arms 38 and 40 as shown in Figure 2. However, the width of the slots 42 and 44 is substantially the same as the dimension B of the arms 38 and 40 so as to snugly receive the arms and prevent undesirable pivotal movement of the clip about an axis vertical to the windshield.

Figure 3:
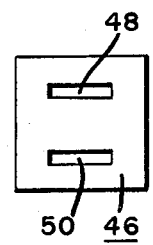
Figure 3 is a view in elevation of the locking plate.

The connector is fixedly attached to the holder 18 by means of a locking plate 46, as shown in Figure 3. The locking plate 46 has a pair of spaced slots 48 and 50 adapted to receive the ends 52 and 54 of the arms 38 and 40, respectively, the ends 42 and 44 being outwardly turned, or formed over the locking plate 46 as shown in Figure 4. The improved attaching means for the connector permits relative pivotal movement between the connector and the wiper blade assembly about an axis parallel to the surface of the windshield throughout an angle C as indicated in Figure 2 which axis is transverse to the wiper blade, the angular movement between the wiper blade and clip being limited by engagement of the locking plate 46 with the surface of the channeled holder 18. However, the connector cannot move about an axis normal to the windshield due to the fact that the arms 38 and 40 are confined by slots 42 and 44 in the holder. Accordingly, undesirable turning of the wiper blade in the plane of the windshield will be positively prevented.

While the embodiment of the invention as herein disclosed constitutes a preferred form, it is to be understood that other forms might be adopted.

What is claimed is as follows:

1. In combination, an elongate channeled support, a connector, and means attaching said connector to said support permitting predetermined relative angular movement therebetween about an axis transverse to said support including a pair of arms depending from said connector and extending through a pair of slots in said support and means disposed entirely within said channeled support and interconnecting said depending arms.

2. In combination, an elongate support, a connector, and means attaching said connector to said support permitting predetermined relative angular movement therebetween about an axis transverse to said support including a pair of arms depending from said connector and extending through a pair of slots in said support and a locking plate attached to said arms.

3. In combination, an elongate support, a connector, and means attaching said connector to said support permitting predetermined relative angular movement therebetween about an axis transverse to said support including a pair of arms depending from said connector and extending through a pair of slots in said support and a locking plate attached to said arms, said arms having outwardly extending end portions formed over said plate.

4. A connector for establishing a detachable connection between a windshield wiper blade and a wiper arm, said wiper blade having a pressure applying superstructure including a channeled holder, said connector comprising an inverted channel member constituting a socket adapted to receive an entering part of said wiper arm, means attaching said connector to said holder permitting predetermined relative angular movement therebetween about an axis transverse to the holder including a pair of tangs depending from said connector and extending through a pair of slots in said holder and means disposed entirely within said channeled holder and interconnecting said depending tangs.

5. A connector for establishing a detachable connection between a windshield wiper blade and a wiper arm, said wiper blade having a pressure applying superstructure including a channeled holder, said connector comprising an inverted channel member constituting a socket adapted to receive an entering part of said wiper arm, means attaching said connector to said holder permitting predetermined relative angular movement therebetween about an axis transverse to the holder including a pair of tangs depending from said connector and extending through a pair of slots in said holder and a locking plate attached to said tangs.

6. A connector for establishing a detachable connection between a windshield wiper blade and a wiper arm, said wiper blade having a pressure applying superstructure including a channeled holder, said connector comprising an inverted channel member constituting a socket adapted to receive an entering part of said wiper arm, means attaching said connector to said holder permitting predetermined relative angular movement therebetween about an axis transverse to the holder including a pair of tangs depending from said connector and extending through a pair of slots in said holder, and a locking plate attached to said tangs, said tangs having outwardly extending end portions formed over said plate.

7. A connector for establishing a detachable connection between a windshield wiper blade and a wiper arm, said wiper blade having a pressure applying superstructure including a channelled holder, said connector comprising an inverted channel member constituting a socket adapted to receive an entering part of said wiper arm, means attaching said connector to said holder permitting predetermined relative angular movement therebetween about an axis transverse to the holder including a pair of tangs depending from said connector and extending through a pair of slots in said holder, and a locking plate attached to said tangs, said tangs having outwardly extending end portions formed over said locking plate, said locking plate being disposed within said channelled holder and engageable therewith to limit pivotal movement between said connector and said holder about the axis transverse to said holder.

References Cited in the file of this patent

UNITED STATES PATENTS

| | | |
|---|---|---|
| 1,994,738 | Ritz-Woller | Mar. 19, 1935 |
| 2,418,559 | Scinta | Apr. 8, 1947 |
| 2,752,626 | Oishei | July 3, 1956 |
| 2,806,241 | Oishei | Sept. 17, 1957 |
| 2,807,822 | Scinta | Oct. 1, 1957 |
| 2,861,290 | Hoyler | Nov. 25, 1958 |